United States Patent
Kadoriku et al.

(10) Patent No.: US 6,461,142 B1
(45) Date of Patent: Oct. 8, 2002

(54) INJECTION DEVICE

(75) Inventors: Shinji Kadoriku, Takarazuka; Takaaki Higashida, Kadoma; Hiroshi Yutani, Katano; Tadao Murata, Sanda, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/180,488

(22) PCT Filed: May 9, 1997

(86) PCT No.: PCT/JP97/01557

§ 371 (c)(1),
(2), (4) Date: Nov. 12, 1998

(87) PCT Pub. No.: WO97/43106

PCT Pub. Date: Nov. 20, 1997

(30) Foreign Application Priority Data

May 13, 1996 (JP) ............................. 8-117637

(51) Int. Cl.⁷ .................... B29C 45/53; B29C 45/56
(52) U.S. Cl. ................... 425/558; 425/561; 425/564
(58) Field of Search ................. 425/561, 557, 425/558, 559, 564

(56) References Cited

U.S. PATENT DOCUMENTS

| | | | |
|---|---|---|---|
| 2,950,501 | 8/1960 | Harkenrider | 425/146 |
| 3,698,845 | * 10/1972 | Paulson | 425/145 |
| 3,888,393 | * 6/1975 | Drori | 222/229 |
| 3,941,529 | * 3/1976 | Klingebiel | 425/4 R |
| 5,030,080 | * 7/1991 | Fukuda et al. | 425/148 |
| 5,441,400 | 8/1995 | Zeiger | 425/562 |
| 5,460,502 | 10/1995 | Majercak | 425/116 |

FOREIGN PATENT DOCUMENTS

| | | |
|---|---|---|
| JP | 59-073933 | 4/1984 |
| JP | 2-116529 | 5/1990 |
| JP | 4-022613 | 1/1992 |
| JP | 6-166072 | 6/1994 |
| JP | 7-108575 | 4/1995 |

* cited by examiner

Primary Examiner—Jan H. Silbaugh
Assistant Examiner—Emmanuel S. Luk
(74) Attorney, Agent, or Firm—Wenderoth, Lind & Ponack, L.L.P.

(57) ABSTRACT

An injection device includes a cylinder, a plunger and a driving device. The cylinder has a port for supplying molding material into the cylinder, and the molding material supplies into the cylinder is compressed by the plunger. The plunger has a groove extending circumferentially around an outer wall of a large-diameter portion of the plunger, and the clearance between the outer wall of the large-diameter portion of the plunger and the inner wall of the cylinder is determined by a specified equation.

8 Claims, 8 Drawing Sheets

INJECTION DEVICE

TECHNICAL FIELD

The present invention relates to an injection device used for molding a resin.

BACKGROUND ART

A known injection device used for molding a resin comprises a cylinder having an injection nozzle at an end thereof, a plunger sliding in the axial direction in a position opposite to the injection nozzle within the cylinder, and a driving device for advancing and retracting the plunger. The cylinder has a port for supplying a molding material between the sliding position of the plunger and the injection nozzle, and the molding material supplied into the cylinder is compressed by advancement of the plunger, so that the molding material is injected into a cavity of molds connected to the injection nozzle. In such an injection device, a screw for melting the molding material is provided outside the cylinder in the case of a pre-plasticizing type, and is provided integrally with a leading end of the plunger within the cylinder in the case of an in-line type. The plunger of such an injection device of the pre-plasticizing type may be provided with a larger diameter portion in contact with an inner circumferential wall surface of the cylinder for isolating inner and outer regions of the cylinder from each other and a smaller diameter portion in a leading end thereof.

The above injection device of a conventional injection molding machine has presented such issues as described below.

When the molds are opened for removing a product, a molding material is forced out of a leading end of the injection nozzle, causing a so-called drooling condition. Therefore, if the pressure (back pressure) of the molding material in the side of a plunger head is too high, while weighing comes to be unstable, or if the back pressure is too low, a suck-back operation has been conducted for moving the plunger slightly further backward from a position of the plunger after it has been pushed back by the back pressure to an extent sufficient to prevent the drooling.

In order to prevent the molding material from leaking out of the cylinder through a clearance (gap) between the cylinder and the plunger at the time the molding material is supplied into the cylinder, the molding material is injected into the mold cavity and the like, the length of a portion of the plunger in contact with the cylinder has been made longer. In addition, the clearance between the plunger and the cylinder has been reduced, that is, narrowed to such a minimum extent to allow the plunger to slide.

In the cylinder, a check valve (ring valve) has been employed between a fluid holding part with the injection nozzle and the supply port for preventing a molten liquid of molding material held in the fluid holding part from flowing back to the supply port. The check valve is brought into tight contact with a valve seat of the plunger by the back pressure of the molten liquid of molding material, when the backward movement of the plunger is discontinued after weighing, so that back flow of the molten liquid to the supply port is prevented.

On the other hand, in an attempt to prevent back flow of the molding material from the mold cavity to an inner region of the cylinder until completion of a pressure-holding and compression process after injection of the molding material to the mold cavity, a pressure control has been conducted by applying a force to the plunger in the advancing direction of the plunger until completion of the pressure-holding and compression process after injection of the molding material to the mold cavity. Therefore, a force of the molding material flowing back from the mold cavity into the cylinder is counterbalanced with the force applied to the plunger.

Such an injection device according to the prior art, however, has the below-mentioned issues.

During the suck-back operation, because the inner region of the cylinder is reduced in pressure, the air is brought into the cylinder from outside the cylinder through a trailing end of the plunger, and the air is entrapped in a product as a void (bubble), causing a defect in the product. Although $P_2 > P_0$ at the time of weighing of the molding material, $P_2 < P_0$ after completion of the weighing where a pressure of molding material from the plunger head to a guide is $P_1$, a pressure of the molding material (back pressure) in the side of a leading end of the plunger head is $P_2$, and a pressure outside the cylinder is $P_0$ (atmospheric pressure). Entrainment of the air from outside the cylinder is caused at $P_1 < P_0$ due to such reason as insufficient closing of the check-valve.

Even if the clearance between the plunger and the cylinder is narrowed, the molding material is adhered to the wall surfaces of the plunger and the cylinder in the sliding zone of the plunger, and it is unavoidable that the molding material enters between the plunger and the cylinder. Moreover, once the molding material enters between the plunger and the cylinder, it does not readily flow between them, because the clearance is very narrow, and retention of the molding material in the clearance is caused. The molding material retained therein is reduced in quality and carbonized due to a frictional heat caused by sliding movement of the plunger. Then, the carbide is entrained in the molding material in the cylinder, and contaminates a molded product, causing a defect in the product.

Shown in FIG. 8A is an injection device of pre-plasticizing type comprising a plunger 2 with a larger diameter portion 21 in contact with an inner circumferential wall surface of a cylinder 1 for isolating inner and outer regions of the cylinder from each other, and a smaller diameter portion 22 in a leading end thereof. A molten liquid of molding material fed from a port 12 for supplying the molding material in the cylinder 1 is guided toward an injection nozzle (lower side of the figure, not shown) by a stepped surface 23 in a boundary between the larger diameter portion 21 and the smaller diameter portion 22. However, a part of the molten liquid of molding material supplied from the molding material supply port 12 is divided into two streams flowing in the right and left directions about the smaller diameter portion 22 of the plunger 2 as shown in FIG. 8B, and these streams collide against each other in a position backside in relation to the supply port 12. This collision causes a stagnating area 9 at that position. Then, the molding material in the stagnating area 9 is reduced in quality and carbonized by heat, and the carbide is removed from the wall surface of the smaller diameter portion 22, and contaminates a product, causing a defect in the product.

The check valve is not brought into sufficiently tight contact with the valve seat of the plunger, that is, it is not completely closed, even when the backward movement of the plunger is discontinued after completion of weighing, and is completely closed only after injection is completed. Therefore, a significant and unstable quantity of molten liquid of the molding material flows back before the valve is completely closed. As a result, a present quantity of the molding material to be supplied and an actual quantity of molding material supplied are unequal to each other, because the actual quantity supplied has been varied. Thus, it has been difficult to assure a fixed quantity of molding material to be supplied into the mold cavity.

In the pressure control described above, the position of the plunger in the cylinder should be stable. However, as the pressure of the molding material in the mold cavity during the pressure-holding and compression process and the force applied to the plunger in the advancing direction of the plunger are balanced with each other, the balance between them is actually varied in a subtle manner. Therefore, the position of the plunger is varied, so that it has been difficult to consistently maintain the forces in perfectly balanced condition in order to provide a constant holding pressure. Accordingly, the molding material is forced in and out of the molding cavity during the pressure-holding and compression process, and it has been difficult to assure that a fixed quantity of molding material is supplied into the cavity.

SUMMARY OF THE INVENTION

Accordingly, an object of the present invention is to provide an injection device capable of eliminating defects in a molding due to entrainment of carbides and voids and difficulty in assuring a fixed quantity of molding material to be supplied into a mold cavity.

In accomplishing these and other aspects, according to one aspect of the present invention, there is provided an injection device comprising a cylinder, a plunger, and a driving device. The cylinder has an injection nozzle at an end thereof. The plunger is capable of sliding in an axial direction thereof in a position opposite to the injection nozzle within the cylinder, and the driving device advances and retracts the plunger.

The cylinder has a port for supplying a molding material between a sliding position of the plunger and the injection nozzle, and the molding material supplied into the cylinder is compressed by advancement of the plunger. Thus, the molding material is injected into a cavity of a mold connected to the injection nozzle. In addition, the plunger has a groove circumferentially extending along an outer circumferential wall surface thereof. The injection device may be either of a pre-plasticizing type or in-line type.

A pressure in an inner region X of the cylinder is $P_x$, a pressure in an outer region Z of the cylinder is $P_z$, and a pressure in an area Y of the plunger is $P_y$. The air in the outer region of the cylinder cannot be drawn into the inner region of the cylinder if the inner region of the cylinder is at a positive pressure ($+P_x$), because a pressure gradient shown by a solid line in FIG. 6, that is, a gradient of (a positive pressure $+P_y$) in the area Y of plunger is present between the inner and outer regions of the cylinder. However, the air in the outer region of the cylinder is drawn into the inner region of the cylinder, if no groove is provided in the outer circumferential wall surface of the plunger when the inner region of the cylinder is at a negative pressure ($-P_x$), because a pressure gradient shown by a dotted line in FIG. 6, that is, a gradient of (a negative pressure $-P_y$) in the area of plunger is present between the inner and outer regions of the cylinder. In contrast, if a groove is provided in the outer circumferential wall surface of the plunger, as shown in an alternate long and short dash line in FIG. 6, a positive pressure ($+P_y$) can be temporarily maintained in an area of the groove, and the air is prevented from being drawn into the inner region of the cylinder.

Although one such groove may be provided, it is preferable to provide a plurality of such grooves for the purpose of increasing an effect of preventing the air from being drawn from outside the cylinder. Although the groove may have any sectional shape, in order to prevent retention of a molding material in a bottom part of the groove, it is preferably formed with round corners in the bottom part of the groove.

The injection device of a second aspect of the present invention is characterized in that it is a pre-plasticizing type. The plunger has a smaller diameter portion in a leading part and a larger diameter portion in a trailing part thereof. An outer circumferential wall surface of the larger diameter portion of the plunger is in contact with an inner circumferential wall surface of the cylinder for isolating inner and outer regions of the cylinder from each other. Thus, a molding material is guided toward the injection nozzle by a stepped surface between the smaller diameter portion and the larger diameter portion. If one groove is provided in the plunger, a clearance between the outer circumferential wall surface of the larger diameter portion of the plunger and the inner circumferential wall surface of the cylinder is defined by a below-described equation 1 where η is a viscosity of the molding material, P is a back pressure (kgf/cm$^2$) during weighing, Q is a quantity (cm$^3$/s) of the molding material to be supplied, R is an inner radius of the cylinder, $r_1$ is an outer radius of the smaller diameter portion, $r_2$ is an outer radius of a part of the larger diameter portion before the groove, $r_3$ is an outer radius of a bottom surface of the groove, $r_4$ is an outer radius of a part of the larger diameter portion after the groove, $l_1$ is an axial length of the smaller diameter portion, $l_2$ is an axial length of the part of the larger diameter portion before the groove, $l_3$ is an axial length (width) of the groove, $l_4$ is an axial length of the part of the larger diameter portion after the groove, and k is the ratio of a flow rate in the upward direction of the plunger from a port for supplying the molding material into the cylinder to a total quantity of the molding material supplied.

$$\pi P/2\eta Q + \{(1-k)l_1/[(R^4-r_1^4)-(R^2-r_1^2)^2/(l_1R-l_1r_1)]\}$$
$$= kl_2/[(R^4-r_2^4)-(R^2-r_2^2)^2/(l_2R-l_2r_2)]$$
$$+ kl_3/[(R^4-r_3^4)-(R^2-r_3^2)^2/(l_3R-l_3r_3)]$$
$$+ kl_4/[(R^4-r_4^4)-(R^2-r_4^2)^2/(l_4R-l_4r_4)] \quad\quad \text{[Equation 1]}$$

By providing the smaller diameter portion and the larger diameter portion in the plunger, and guiding the molding material toward the injection nozzle by the stepped surface in the boundary between them, back flow of a molten liquid of the molding material is reduced. For smoothly effecting the guiding operation, it is preferable that the molding material supply port is partly covered by the larger diameter portion when the molding material is supplied from the molding material supply port.

By defining the clearance between the outer circumferential wall surface of the larger diameter portion of the plunger and the inner circumferential wall surface of the cylinder as set forth above, the molten liquid of molding material can flow more easily in the clearance in comparison with the prior art, and the wall surfaces are washed by the molding material, so that stagnation of the molding material is reduced. Degradation and carbonization of the molding material can thereby be prevented.

In this regard, although the length of the larger diameter portion of the plunger should be shorter and the clearance should be increased in order to prevent stagnation of the molding material, the length of the larger diameter portion of the plunger should be longer and the clearance should be reduced in order to prevent entrainment of air from the outer region of the cylinder to the inner region of the cylinder. Thus, the parameters are in close relation with each other, and the inventors, as a result of studies, have obtained the above equation 1 for determining an optimum value of the clearance.

The equation 1 could be derived from equations shown below. That is, the following equation 2 is given where pressure losses in parts A, B, C, and D in a sliding zone of the plunger 2 within the cylinder 1 are $P_A$, $P_B$, $P_C$, and $P_D$, as shown in FIG. 4.

$$dP_A/dx=(2\eta Q_1/\pi)\{1/[(R^4-r_1^4)-(R^2-r_1^2)/(l_1R-l_1r_1)]\}$$

$$dP_B/dx=(2\eta Q_2/\pi)\{1/[(R^4-r_2^4)-(R^2-r_2^2)/(l_2R-l_2r_2)]\}$$

$$dP_C/dx=(2\eta Q_2/\pi)\{1/[(R^4-r_3^4)-(R^2-r_3^2)/(l_3R-l_3r_3)]\}$$

$$dP_D/dx=(2\eta Q_2/\pi)\{1/[(R^4-r_4^4)-(R^2-r_4^2)/(l_4R-l_4r_4)]\} \quad \text{[Equation 2]}$$

Therefore, the equation 3 is established.

$$P_A=(2\eta Q_1/\pi)\{l_1/[(R^4-r_1^4)-(R^2-r_1^2)/(l_1R-l_1r_1)]\}$$

$$P_B=(2\eta Q_2/\pi)\{l_2/[(R^4-r_2^4)-(R^2-r_2^2)/(l_2R-l_2r_2)]\}$$

$$P_C=(2\eta Q_2/\pi)\{l_3/[(R^4-r_3^4)-(R^2-r_3^2)/(l_3R-l_3r_3)]\}$$

$$P_D=(2\eta Q_2/\pi)\{l_4/[(R^4-r_4^4)-(R^2-r_4^2)/(l_4R-l_4r_4)]\} \quad \text{[Equation 3]}$$

Here, since $Q=Q_1+Q_2$, $P+P_A=P_B+P_C+P_D$, and $Q_1=(1-k)Q$, if $Q_2=kQ$, a below-described equation 4 is given.

$$P+(2\eta(1-k)Ql_1/\pi\{(R^4-r_1^4)-(R^2-r_1^2)/(l_1R-l_1r_1)\}$$

$$=(2\eta kQl_2/\pi\{(R^4-r_2^4)-(R^2-r_2^2)/(l_2R-l_2r_2)\}$$

$$+(2\eta kQl_3/\pi\{(R^4-r_3^4)-(R^2-r_3^2)/(l_3R-l_3r_3)\}$$

$$+(2\eta kQl_4/\pi\{(R^4-r_4^4)-(R^2-r_4^2)/(l_4R-l_4r_4)\} \quad \text{[Equation 4]}$$

In such a manner, the first mentioned equation 1 is derived.

An injection device according to an aspect of the invention is further characterized in that it is a pre-plasticizing type. A guide element is provided in the smaller diameter portion of the plunger in a backside position in relation to the supply port for guiding two streams of a molten liquid of molding material. The streams flow circumferentially about the smaller diameter portion to reach the backside position, toward the injection nozzle. In addition, the guide element preferably has a pair of inclined guide surfaces which have approximately the same inclined angle with respect to the axial direction of the plunger. Alternatively, the guide element is preferably formed in a generally triangular shape at a protruding end of its apex, although it is not specifically limited to such form. In such case, two opposite oblique lines of the triangle can be curved for smoother flow of the molten liquid.

The protrusion of the guide element is only required to be convex in the advancing direction of plunger so that it matches the flowing direction of the molding material in order to prevent stagnation of the molding material thereabout. It may, therefore, be in the form of a partition plate, since the stagnating area of molding material is generally triangular, and a relation of xy=c (where x is a base of the shape similar to a triangle of molding material stagnating area (a part of the plunger bottom surface), y is a height of the shape similar to the triangle, and c depends on a viscosity of the molding material and the like) is given, it is preferably formed in the triangular shape, and most preferably such shape that meets the equation. It is further preferable that the convex portion is progressively reduced in thickness toward the apex thereof, and has no thickness at the apex.

The backside position of the smaller diameter portion is preferably located in such a position that occupies an upper half of the molding material supply port in view of preventing back flow and stagnation and facilitating flow of the molding material in the head direction of the plunger, although it is not specifically limited thereto.

In order to assure a fixed quantity of molding material will be supplied into a mold cavity, an injection device of an aspect of the invention is still further characterized in that a check valve is employed between a fluid holding part with the injection nozzle and the supply port for preventing back flow of a molten liquid of molding material held in the fluid holding part to the supply port. The check valve is continuously forced against a valve seat provided in the plunger by means of a spring, which is located in a connecting shaft extending frontward from the plunger. Further, the injection device may be either of a preplasticizing type or an in-line type.

In such case, although the material of the spring is not specifically limited, for example, the spring may be a metal spring or the like. In addition, a coil spring or the like as an example can be employed without limitation to any specific shape. As for the number of springs, at least one spring is required.

Finally, an injection device of an aspect of the invention is characterized in that the driving device is further provided with a control means having a position detector for detecting a position of the plunger within the cylinder in order to control the operation of the driving device according to a detection signal thereof for fixing the position of the plunger at a position at the end of the injection process. Further, the injection device may be either of a pre-plasticizing type or an in-line type.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION TO THE INVENTION

Figure 1:
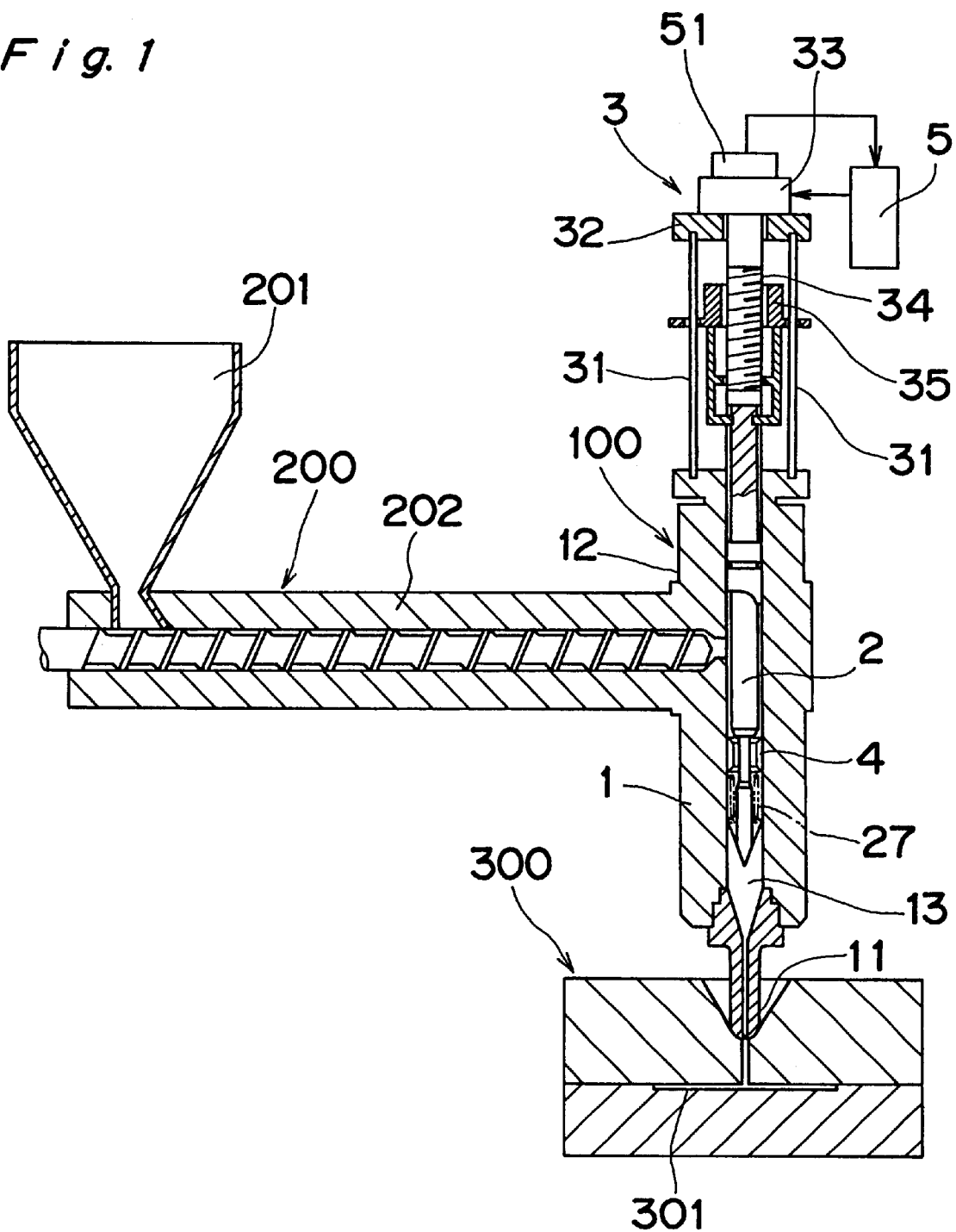
FIG. 1 is a schematic sectional view showing an overall arrangement of an injection device according to an embodiment of the invention, a pre-plasticizing device and molds.

Before the description of the present invention proceeds, it is to be noted that like parts are designated by like reference numerals throughout the accompanying drawings.

By referring to the drawings, embodiments of the invention are described in detail below.

It should be appreciated, however, that the invention is not limited to the embodiments described below. Furthermore, materials, shapes and other conditions of components described with respect to the embodiments are not intended to limit the scope of the invention thereto, unless any restrictive description is made, and are shown only for illustrative purpose.

FIGS. 1 through 5 show an injection device according to an embodiment of the invention. The injection device according to the embodiment is for use in an injection molding machine of a screw-pre-plunger type.

FIG. 1 is a sectional view showing an overall arrangement of an injection device 100, a pre-plasticizing device 200 for supplying a plasticized molding material to the injection device 100, and molds 300 for receiving the plasticized molding material injected from the injection device 100.

The injection device 100 comprises a cylinder 1 having an injection nozzle 11 at an end thereof, a plunger 2 sliding in the axial direction of the cylinder 1 in a position opposite to the injection nozzle 11 within the cylinder 1, and a driving device 3 for advancing and retracting the plunger 2. The cylinder 1 is also provided with a supply port 12 of molding material between the sliding position of the plunger 2 and the injection nozzle 11.

The guide element 24 preferably has at least a pair of inclined guide surfaces 24a, 24b with approximately the same inclined angle to an axial direction of the plunger 2 in order to guide two streams of molten liquid of the molding material flowing about the smaller diameter portion and reaching the backside position toward the injection nozzle with good balance. Furthermore, it is preferable that the guide element 24 is substantially formed as an isogonal trapezoid having the pair of inclined guide surfaces 24a, 24b. It is preferable that in order to more reliably prevent stagnation of the molten liquid of molding material at a lower portion of the lower end of the trapezoid, the guide element 24 has the general form of an isosceles triangle having a protruding end of an apex thereof directed to the injection nozzle. Moreover, it is preferable that the guide element 24 is formed as an equilateral triangle so as to more effectively guide the molten liquid of molding material.

Figure 2:
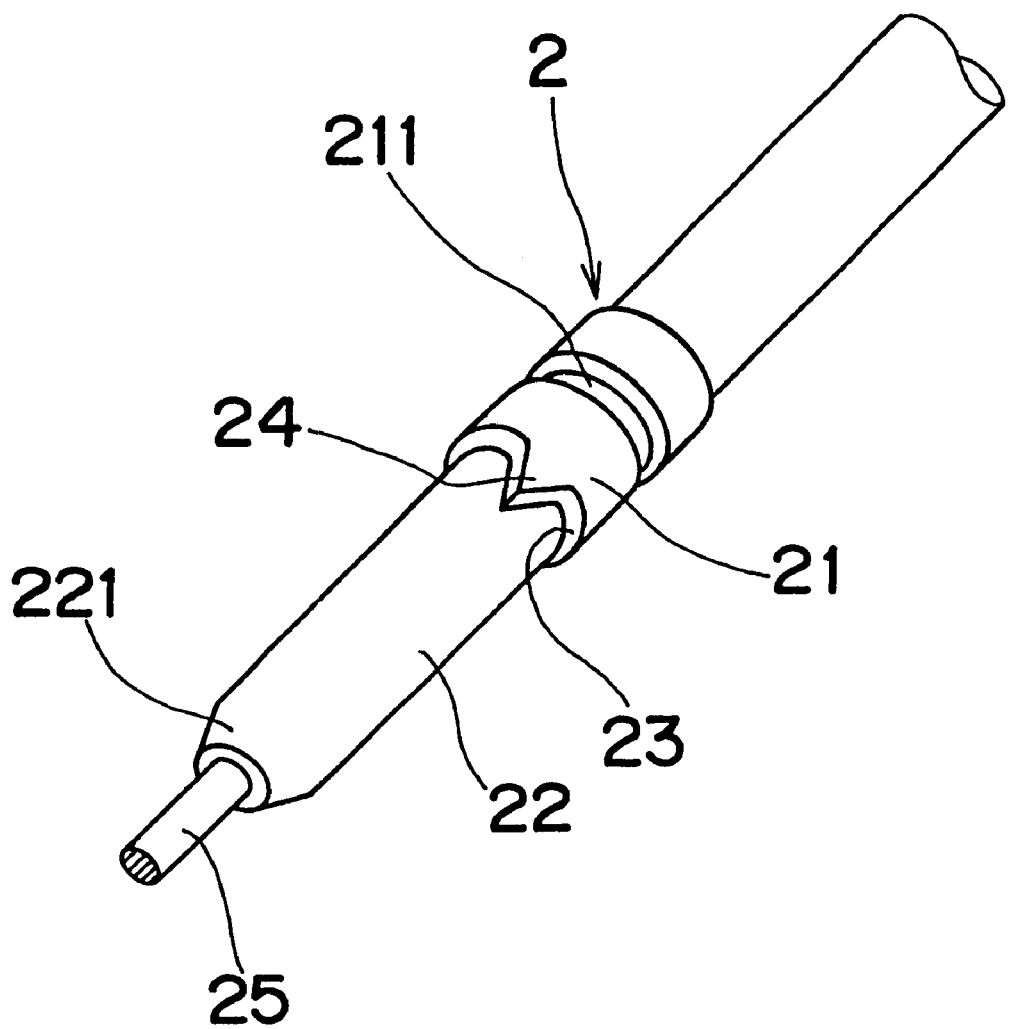
FIG. 2 is a perspective view showing a plunger for use in the embodiment of the invention.
Figure 3:
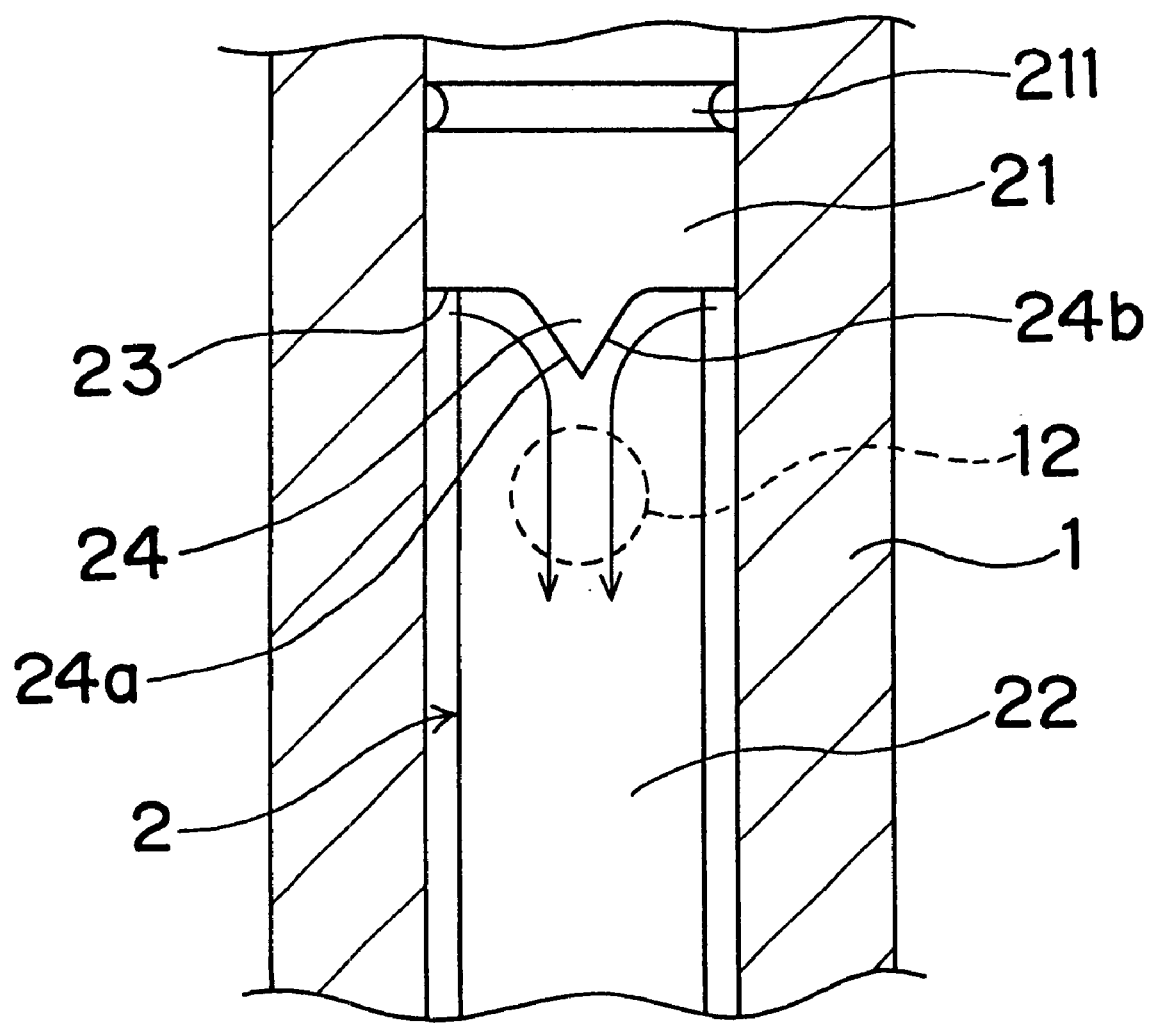
FIG. 3 is a rear view showing a shape of the plunger.
Figure 4:
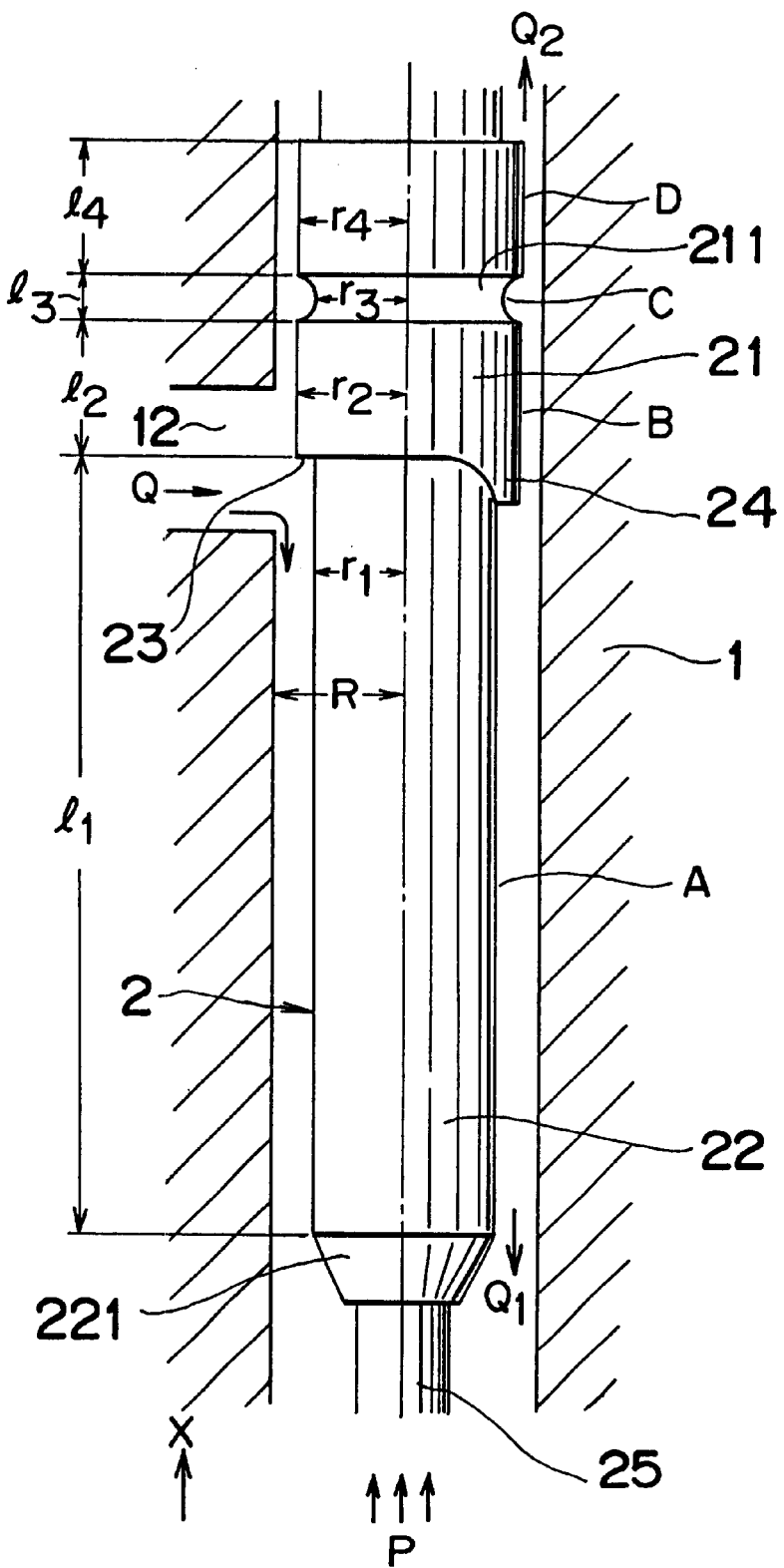
FIG. 4 is a side view showing a shape and dimensions of the plunger.

The plunger 2 has a larger diameter portion 21 and a smaller diameter portion 22 formed integrally in a leading end thereof, as shown in any of FIGS. 2 through 4. The smaller diameter portion 22 is formed with a guide element 24 of a generally triangular shape in a backside position in relation to the molding material supply port 12.

In an outer circumferential wall surface of the larger diameter portion 21 of the plunger 2, a groove 211 is provided for preventing entrainment of air from outside the cylinder. In order to prevent stagnation of the molding material in the concave area of groove 211, the bottom of the groove 211 is rounded as shown in the figures.

In this case, a clearance between the outer circumferential wall surface of the larger diameter portion 21 of the plunger 2 and an inner circumferential wall surface of the cylinder 1 is designed to be at an optimum value in relation to an axial length of the larger diameter portion 21 of the plunger 2 according to the equation 1.

Figure 7:
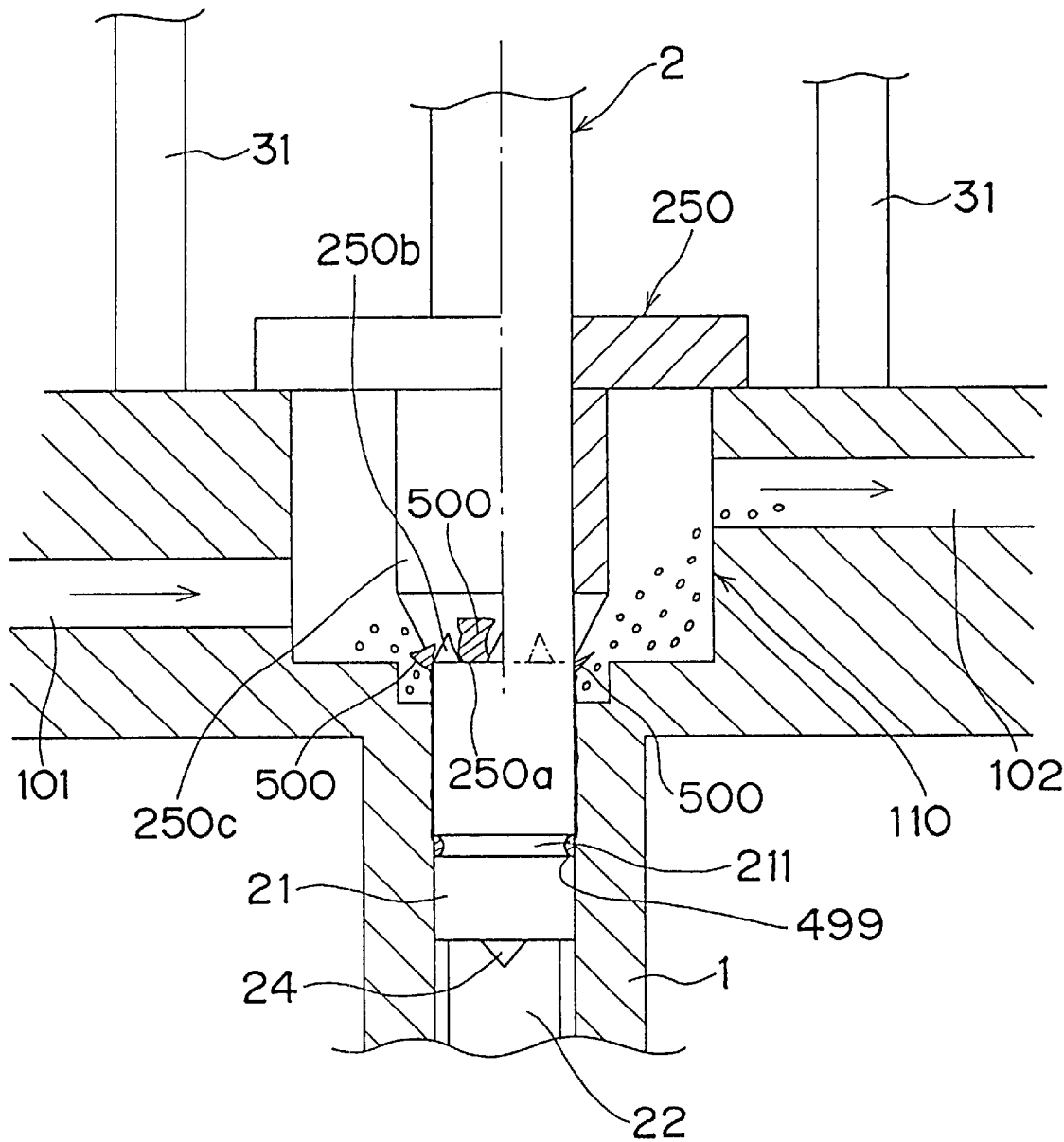
FIG. 7 is a sectional view showing a modification of the embodiment of the present invention with a left half of the plunger showing its outer appearance and a right half of the plunger showing its sectional view.

FIG. 7 shows a modification of the embodiment in which the molding material that goes into and comes out from the groove 211 can be cut (scrapped) by a cutting member 250 to remove the unnecessary molding material from the inside of the cylinder 1 and reliably prevent the stagnation of the molding material in the concave area of groove 211.

In FIG. 7, the molding material comes into the groove 211 of the larger diameter portion 21 of the plunger 2 and then the molding material 499 in the groove 211 flows out from the groove 211 because of the rounded bottom corners of the groove 211 and the movement of the plunger 2. The molding material then flows into a clearance between the upper part of the larger diameter portion 21 and the cylinder 1. Then, the molding material in the clearance may be carbonized by heat to become carbides. The carbides move upward in accordance with the upward and downward movements of the plunger 2 and, finally, come out from the inside of the uppermost part of the cylinder. The cylindrical cutting member 250 is arranged at the uppermost part of the cylinder 1 as shown in FIG. 7. The cutting member 250 has a body 250c with its inner circumferential surface sliding on the outer circumferential wall surface of the plunger 2. At its lower end it has a cutting blade 250a for cutting the carbides 500 from around the plunger 2. The cutting member 250 also has notches 250b, arranged separately at equal distances, for dividing the carbides 500 while the carbides 500 are cut. The plunger 2 slides upward and downward inside the cutting member 250 fixed to the cylinder 1, and then the cylindrical carbides 500 moved upward from the groove 211 are cut by the cutting blade 250a and divided into many chips due to the notches 250b. The carbides 500 are accommodated in a carbide accommodating space 110 provided in the cylinder 1. Compressed air is blown into the space 110 from an air inlet port 101 thereof to discharge the carbides 500 together with the air through a discharge port 102. When the air is sucked through the discharge part 102, the carbides 500 can be more smoothly discharged from the space 110 therethrough. It is preferable that the axial direction of the air inlet port 101 is not located along the axial direction of the discharge port 102 as shown in FIG. 7 to prevent the air from being discharged generally linearly and to cause turbulent flows in the space 110 so that the carbides 500 are more effectively discharged from the space 110. The cutting blade 250a can have a curved surface for guiding the cut carbides 500 so as to separate the carbides 500 from the outer circumferential wall surface of the plunder 2. The cutting blade 250a can also have no notches.

The driving device 3 comprises a slide guide shaft 31 extending from a rear end of the cylinder 1, a servo motor 33 mounted on a support mount 32 at the other end of the slide guide shaft 31, a screw shaft 34 coupled at an end to the servo motor 33 for rotation, and a transmission member 35 engaged with the screw shaft 34. The transmission member 35 is advanced and retracted along the slide guide shaft 31 according to forward and reverse rotations of the screw shaft 34. The transmission member 35 has an end connected to a trailing end of the plunger 2, and transmits its forward and backward movements to the plunger 2 for advancing and retracting the plunger 2.

Figure 5A:
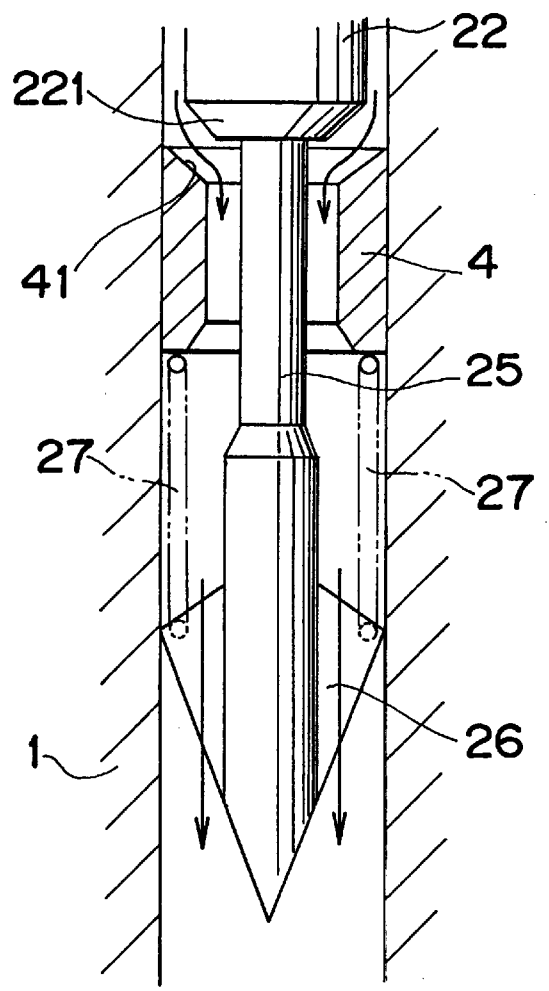
FIGS. 5A, 5B, 5C are explanatory views for explaining the arrangement of a check valve in the embodiment.

As shown in FIG. 1, a check valve 4 is employed between a fluid holding part 13 and the supply port 12 in a stage before the injection nozzle 11 within the cylinder 1 for preventing a molten liquid of molding material held in the fluid holding part 13 from flowing back to the supply port 12. The check valve 4 is cylindrical, as shown in FIG. 5C, and as shown in FIG. 5A, has a connecting shaft 25 passing therethrough which extends from the smaller diameter portion 22 of plunger toward the injection nozzle 11 (see FIG. 1) for sliding within the cylinder 1 in the vertical direction of the figure. At a leading end of the smaller diameter portion 22 of the plunger, a valve seat 221 in conformity with a tapered valve element 41 of the check valve 4 is provided.

A spring 27 is provided and rests on an arrowhead-shaped head 26 formed at a leading end of the connecting shaft 25.

Figure 5B:
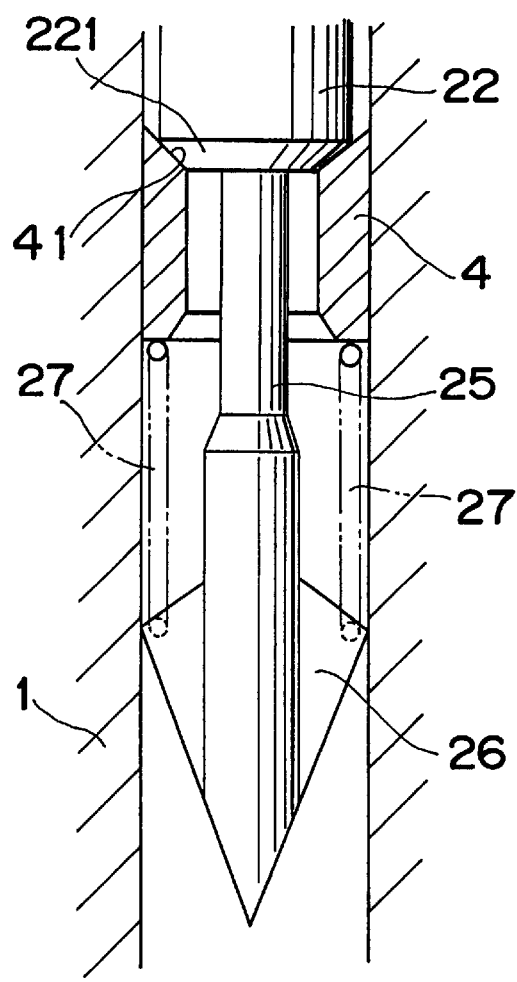
Figure 5C:
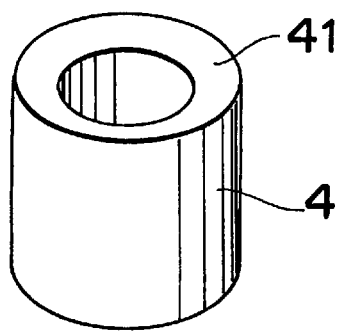
Figure 6:
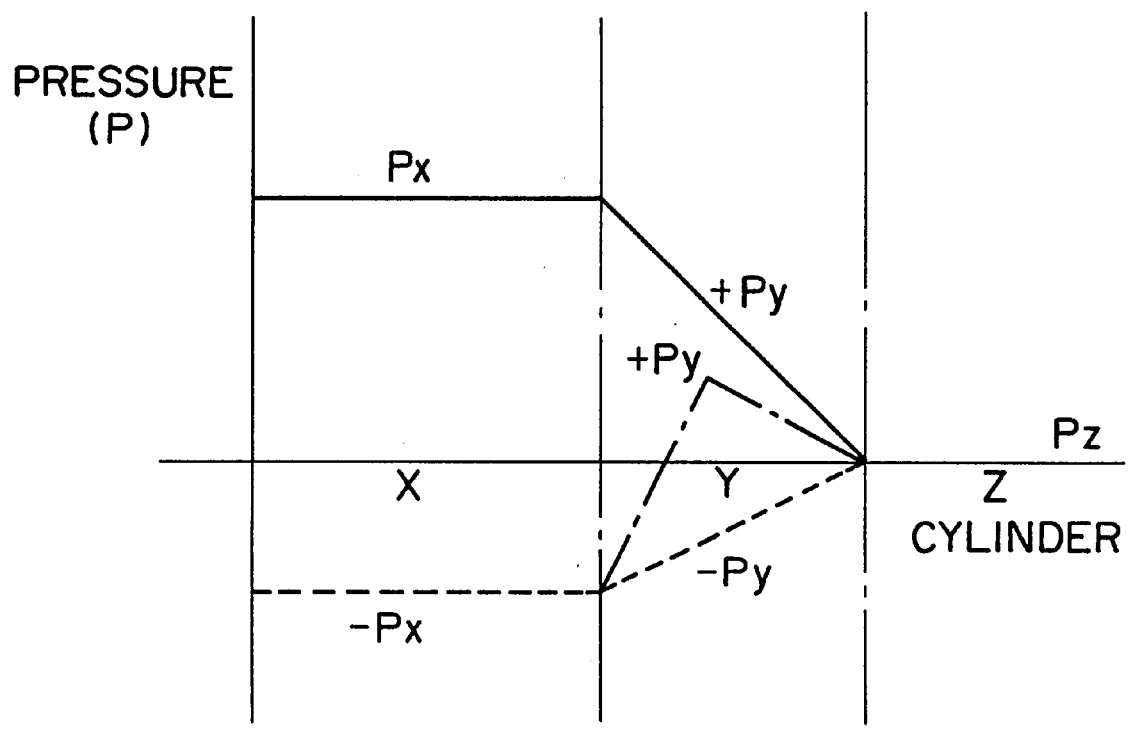
FIG. 6 is a graph for explaining entrainment of air into the cylinder and a solution thereto.

The valve element 41 of the check valve 4 is continuously forced against the valve seat 221 of the smaller diameter portion 22 of the plunger by the spring 27, as shown in FIG. 5B.

As shown in FIG. 1, the driving device 3 includes an encoder 51 associated with the servo motor 33 for detecting an angle of rotation of the servo motor 33. The encoder 51 detects the position of the plunger 2 within the cylinder from the angle of rotation detected. The driving device 3 comprises a controller S for controlling the operation of the driving device 3, and the controller 5 receives a detection signal from the encoder 51 for controlling the operation of the servo motor 33 of the driving device 3.

Figure 8A:
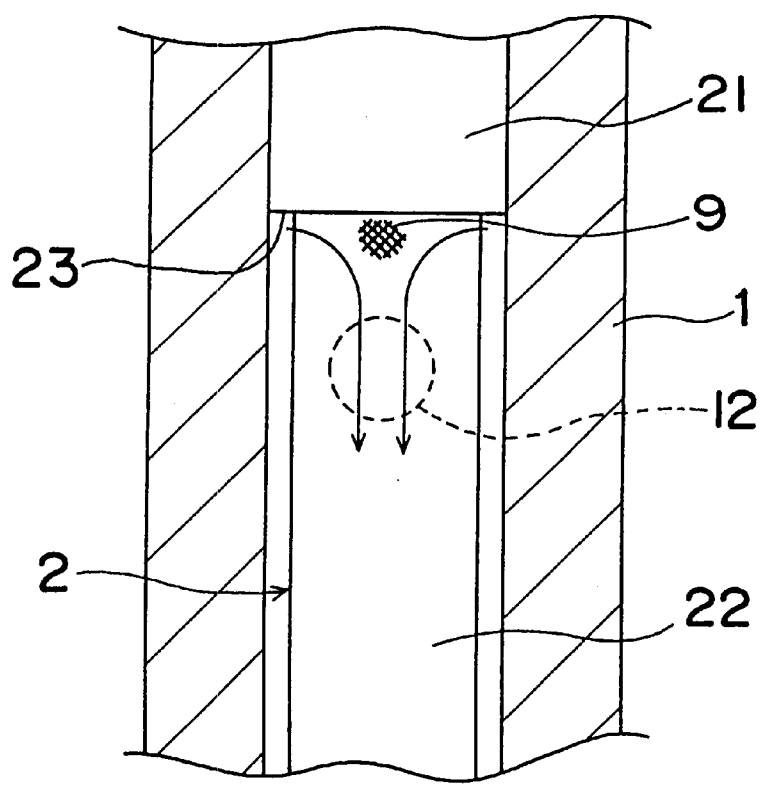
FIGS. 8A and 8B are explanatory views for explaining formation of a stagnating area in a backside position of a smaller diameter portion of the plunger
Figure 8B:
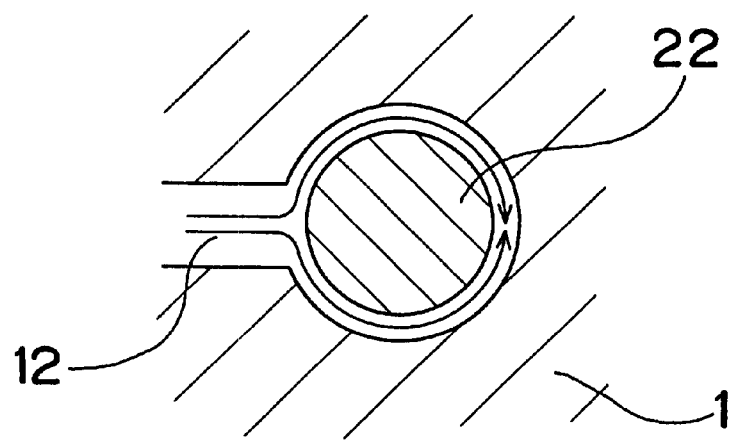

The pre-plasticizing device 200 comprises, as shown in FIG. 1, a hopper 201 and a screw unit 202, and feeds a molding material plasticized in the screw unit 202 through the supply port 12 of cylinder 1 and into the cylinder 1. After the molten liquid of molding material is fed into the cylinder 1, it is guided toward the injection nozzle 11 by a stepped surface 23 in a boundary between the larger diameter portion 21 and the smaller diameter portion 22 of the plunger 2, as shown in FIG. 4. A part of the molding material is divided into two streams, which flow around the smaller diameter portion 22, and reach a backside position in relation to the supply port 12, as shown in FIG. 8B. The two streams are then smoothly guided along the contour of the guide element 24 toward the injection nozzle 11 as shown in FIG. 3, thereby forming no stagnating area in the backside position.

As shown in FIG. 4, by allowing the larger diameter portion 21 of the plunger to close up to approximately one half of the molding material supply port 12, when the molding material is supplied into the cylinder 1, the molding material hardly leaks out of the cylinder through the clearance between the outer circumferential wall surface of the larger diameter portion 21 of the plunger and the inner circumferential wall surface of the cylinder 1. Thus, the molding material can be easily directed toward the injection nozzle 11.

The molding material within the cylinder 1 is forwarded to the fluid holding part 13 ahead of the plunger head 26 for weighing. Although the molding material forwarded to the fluid holding part 13 reacts to the forwarding action and thus causes the plunger 2 to be retracted slightly during the weighing process, as soon as a preset quantity (one shot) of the molding material is in the fluid holding part 13, the plunger 2 is no longer retracted, and the weighing process is completed. The plunger 2 is advanced for compressing the molding material supplied into the cylinder 1. The preset quantity of the molten liquid of molding material held in the fluid holding part 13 within the cylinder 1 maintains a positive pressure by the compression, and is injected due to the positive pressure to a cavity 301 of the mold 300 that is connected to the injection nozzle 11. The molding material forced into the mold cavity 301 at a high speed under a high pressure is maintained at the injection pressure by the plunger 2 until it solidifies.

The check valve 4 closes a passage of the molding material as shown in FIG. 5B, as the valve element 41 of the check valve 4 is pressed against the valve seat 221 in the smaller diameter portion 22 of the plunger during injection, after the injection, and during the pressure-holding process. The passage is open, as shown in FIG. 5A, at the initiation of weighing, during the weighing, and when the molding material is fed, because the feeding pressure of the molding material overcomes the spring force. If the spring 27 is absent, the valve tends to be opened when it is subjected to a negative pressure during suck-back operation. However, because the check-valve 4 is continuously forced upward by the spring 27 in the injection device, it is not opened and keeps closing the passage of the molding material even if it is subjected to a negative pressure. In such manner, back flow of the molding material can be prevented, and a fixed quantity of the molding material can be supplied to the mold cavity 301.

The molding material tends to flow back into the cylinder from inside the mold cavity 301 after injection into the mold cavity 301 until completion of the pressure-holding and compression process. Then, the controller 5 of the driving device 3 detects the position of the plunger 2 within the cylinder 1 using the encoder 51, and controls rotation of the servo motor 33 according to a detection signal thereof. Thus, the plunger 2 is fixed at a proper position at the end of the injection process. The position control allows more reliable regulation of an injection capacity in comparison with the conventional pressure control.

Because the invention is constituted as described above, the following effects are obtained.

In the injection device, the groove is provided circumferentially along the outer circumferential wall surface of the plunger. Thus, entrainment of air from outside the cylinder to inside the cylinder can be prevented, and voids in the mold can thereby be eliminated, so that a molded product of a good quality can be produced.

In the injection device, the smaller diameter portion and the larger diameter portion are provided on the plunger, and the clearance between the outer circumferential wall surface of the larger diameter portion and the inner circumferential wall of the cylinder is defined by the specified equation. Therefore, stagnation of a molding material between the outer circumferential wall surface of the larger diameter portion and the inner circumferential wall surface of the cylinder can be prevented. As a result, a molded product of good quality can be produced without contamination by a carbide of the molding material.

In the injection device, by providing the guide element in the backside position of the smaller diameter portion of the plunger for directing the molding material toward the injection nozzle, stagnation of the molding material in that position can be prevented. Therefore, molded product of a good quality can be produced without contamination by a carbide of the molding material.

In the injection device, by forming the guide element in a generally triangular shape so that it extends toward the injection nozzle at the protruding end of the apex thereof, the molding material can be guided more smoothly, and stagnation can be further prevented.

In the injection device, by continuously applying a force in the closing direction to the check valve by the spring, time required for the check valve to be closed is reduced, back flow can be effectively prevented, a fixed quantity of molding material can be supplied to the mold cavity, and a molded product of a good quality can be produced.

In the injection device, because a fixed quantity of molding material can be supplied into the mold cavity by the position control of the plunger, a molded product of a good quality can be produced.

The entire disclosure of Japanese Application No. 8-117637 filed on May 13, 1996 including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An injection molding device comprising:

a cylinder having a first end, a second end, a supply port between said first end and said second end for supplying a molding material into said cylinder, and an injection nozzle at said first end;

a plunger arranged within said cylinder and adapted to slide within said cylinder between a retracted position and a forward position so as to compress the molding material and push the molding material through said injection nozzle and into a cavity of a mold connected to said injection nozzle, said supply port of said cylinder being located between said retracted position of said plunger and said injection nozzle, said plunger having a small-diameter portion, a large-diameter portion, and a stepped surface between said small-diameter portion and said large-diameter portion for guiding the molding material toward said injection nozzle, and having a groove extending in a circumferential direction around an outer wall surface of said large-diameter portion so as to oppose an inner wall surface of said cylinder between said supply port and said second end of said cylinder; and a driving device connected to said plunger for sliding said plunger within said cylinder;

wherein a clearance between said outer wall surface of said large-diameter portion of said plunger and said inner wall surface of said cylinder is defined by the following equation:

$$\pi P/2\eta Q + \{(1-k)l_1/[(R^4-r_1^4)-(R^2-r_1^2)/(l_1R-l_1r_1)]\}$$
$$= kl_2/[(R^4-r_2^4)-(R^2-r_2^2)/(l_2R-l_2r_2)]$$
$$+ kl_3/[(R^4-r_3^4)-(R^2-r_3^2)/(l_3R-l_3r_3)]$$
$$+ kl_4/[(R^4-r_4^4)-(R^2-r_4^2)/(l_4R-l_4r_2)]$$

wherein:

$\eta$ is a viscosity of the molding material;

P is a back pressure during weighing in $kgf/cm^2$;

Q is a quantity of the molding material to be supplied in $cm^3/s$;

R is an inner radius of said cylinder;

$r_1$ is an outer radius of said small-diameter portion of said plunger;

$r_2$ is an outer radius of said large-diameter portion of said plunger below said groove;

$r_3$ is an outer radius of a bottom surface of said groove;

$r_4$ is an outer radius of said large-diameter portion of said plunger above said groove;

$l_1$ is an axial length of said small-diameter portion of said plunger;

$l_2$ is an axial length of said large-diameter portion of said plunger below said groove;

$l_3$ is an axial length of said groove;

$l_4$ is an axial length of said large-diameter portion of said plunger above said groove; and k is a ratio of a flow rate of molding material flowing in an upward direction from said supply port into said cylinder to a flow rate of a total quantity of the molding material flowing from said supply port into said cylinder.

2. The injection device of claim 1, wherein said small-diameter portion of said plunger has a guide element at said stepped surface, said guide element being located at a backside position of said plunger relative to said supply port such that two streams of molding material flowing into said cylinder from said supply port and flowing around said small-diameter portion of said plunger are guided downward toward said injection nozzle.

3. The injection device of claim 2, wherein said guide element has a pair of inclined guide surfaces, said inclined guide surfaces being formed so as to have approximately the same angle of inclination relative to an axial direction of said plunger.

4. The injection device of claim 2, further comprising a spring and a check valve in said cylinder between a fluid holding portion of said injection nozzle and said supply port for preventing the molding material in said fluid holding portion of said injection nozzle from flowing back to said supply port, said check valve having a valve element, said spring being arranged around a connecting shaft of said plunger such that said spring presses said valve element of said check valve against a valve seat of said plunger.

5. The injection device of claim 1, further comprising a spring and a check valve in said cylinder between a fluid holding portion of said injection nozzle and said supply port for preventing the molding material in said fluid holding portion of said injection nozzle from flowing back to said supply port, said check valve having a valve element, said spring being arranged around a connecting shaft of said plunger such that said spring presses said valve element of said check valve against a valve seat of said plunger.

6. The injection device of claim 5, wherein said valve element of said check valve has a tapered portion conforming to a tapered portion of said valve seat of said plunger.

7. The injection device of claim 1, wherein said driving device includes a controller having a position detector for detecting a position of said plunger within said cylinder and for generating a detection signal such that said controller can control said driving device to position said plunger after completion of injection of the molding material through said injection nozzle.

8. The injection device of claim 7, wherein said valve element of said check valve has a tapered portion conforming to a tapered portion of said valve seat of said plunger.

* * * * *

UNITED STATES PATENT AND TRADEMARK OFFICE
CERTIFICATE OF CORRECTION

PATENT NO. : 6,461,142 B1
DATED : October 8, 2002
INVENTOR(S) : Shinji Kadoriku et al.

It is certified that error appears in the above-identified patent and that said Letters Patent is hereby corrected as shown below:

Column 11,
Line 44, change "+ $kl_4 / [ (R^4 - r_4^4) - (R^2 - r_4^2) / (l_4R - l_4r_2) ]$" to
-- + $kl_4 / [ (R^4 - r_4^4) - (R^2 - r_4^2) / (l_4R - l_4r_4) ]$ --.

Signed and Sealed this

Eighteenth Day of February, 2003

JAMES E. ROGAN
*Director of the United States Patent and Trademark Office*